United States Patent Office 3,598,632
Patented Aug. 10, 1971

3,598,632
METHOD OF COATING GLASS SURFACE AND PRODUCTS PRODUCED THEREBY
Alton W. Long, Toledo, Ohio, assignor to Owens-Illinois, Inc.
No Drawing. Continuation of application Ser. No. 647,239, June 19, 1967. This application May 18, 1970, Ser. No. 37,463
Int. Cl. C03c *17/32*
U.S. Cl. 117—69                                30 Claims

ABSTRACT OF THE DISCLOSURE

The method of producing abrasion resistant glass surfaces comprising: pyrolyzing a metal oxide onto the glass surface at temperatures above the pyrolyzing temperature of the metal compound employed, followed by applying to this treated glass surface, an aqueous solution of the reaction product of a hydroxylated organic compound and the interpolymer of methyl vinyl ether and maleic anhydride, at temperatures below 450° F.

---

This application is a continuation of application Ser. No. 647,239, filed June 19, 1967, now abandoned.

The present invention relates to the treatment of glass surfaces which are subjected to abrasive contact with each other in the course of handling, filling and packaging operations, and, more particularly, to a method for treating glass surfaces and articles to enhance their resistance to scratching and retain the strength characteristics of the glass. This invention further pertains to glass articles having improved scratch resistance and superior strength produced by the aforesaid method.

It is generally known that glass derives its strength from an unblemished surface and any scratches or surface imperfections which are present on its surface considerably decreases the strength of the glass. Glass articles such as jars, bottles, tumblers and containers in general possess their maximum strength shortly after they are formed in the glass forming operation. However, this strength rapidly diminishes as the glass articles are handled in an abusive manner such as when they come into contact with each other and bump into each other or other surfaces as is the case in normal handling, packaging and shipping operations.

In the food and beverage processing field this problem is particularly acute because the glass containers are subjected to a number of processing cycles wherein they are successively washed, filled, closed and packaged for delivery. In spite of the precautions taken to minimize scratching and abusive handling, the containers nevertheless are subjected many times to washing, sterilizing and vacuum treatments, depending, of course, on the particular products with which they are filled. All of these operations necessitate rubbing or contacting the glass in a number of ways which can cause scratching.

During each of these operations, bottles continuously come into contact with each other as they move from station to station and as they are handled by the various apparatus. Breakage of the containers during these handling operations is costly, particularly if the breakage occurs after the containers have been filled.

In an effort to minimize the loss of strength and the resulting breakage which is a direct result of the scratching and abrading of the glass surfaces during the aforesaid operations, various attempts have been made in the past to coat the exterior glass surfaces with an abrasion resistant coating of one type or another. Many of these coating compositions have been employed commercially and impart satisfactory scratch resistant properties to glassware of all types. A number of these methods have not been entirely satisfactory, however, and various shortcomings and disadvantages exist with respect to many of the prior art methods and compositions for rendering glass surfaces abrasion resistant. For example, in some instances, although the glass surfaces may be improved with respect to scratch and abrasion resistance, the affinity of the usual paper labeling adhesives for these surfaces is considerably reduced. As a result, it is difficult to apply paper labels to these surfaces. Frequently, the treated surfaces present a worse labeling surface than does the bare untreated glass.

In evaluating a protective coating for glass surfaces, it is desirable that the containers be coated with a composition which imparts satisfactory scratch resistance to the glass article, both when the glass surface is wet as well as when it is dry. Moreover, the coating utilized to impart the scratch resistance, must not be substantially affected by the various washing cycles, such as a dilute caustic wash, to which the glass container is subjected in the course of its normal filling operations.

Accordingly, it is an object of this invention to provide a method for forming a durable protective coating on a glass surface while avoiding the shortcomings and disadvantages of methods and compositions known and used in the past.

A further object of the present invention is to provide a thin, substantially transparent coating on a glass surface, which coating is highly resistant to abrasion while simultaneously substantially maintaining the strength characteristics of the glass.

Another object of the invention is to provide a method of coating a glass surface so as to impart thereto improved scratch resistance properties, both in the wet and dry condition, thereby permitting the container to undergo normal handling, processing and shipping operations without materially decreasing the strength of the container due to scratches resulting from the jostling and rubbing of the glass surface with each other and with other surfaces.

A further object of this invention is to provide an article of manufacture having a glass surface, and a tightly adherent thin, substantially colorless and transparent coating on the aforementioned glass surface, which coating imparts satisfactory scratch and abrasion resistant properties to the glass surface.

A still further object of this invention is to provide glassware having a tightly adhering, thin, substantially colorless and transparent coating on its surface which coating imparts increased strength and resistance to the ware enabling it to withstand greater internal pressures without breakage.

Yet another object is to provide a water soluble damage preventive coating for glass surfaces that becomes water and caustic resistant when applied to a warm glass surface and yet is receptive to printing inks.

In attaining the objects of this invention, one feature resides in treating the glass surface with a titanium or tin-containing compound which is capable of being pyrolyzed, i.e., chemically decomposed by the action of heat, to form oxides of titanium or tin on the glass surface while the surface is at a temperature above the pyrolyzing temperature of the compound, cooling the treated glass, such as by passing it through an annealing lehr, and applying to the cooled surface while it is at a temperature below about 450° F., an aqueous solution of the reaction product of a hydroxylated organic compound and poly(methyl vinyl ether/maleic anhydride).

The term "hydroxylated organic compound" has been used above. This term is known in the art, and refers to compounds having the carbinol structural linkage

where the functional group is the hydroxyl (—OH) group.

The above and other objects, features and advantages of the present invention will become apparent from the following detailed description and claims.

According to the present invention, a glass surface, which can be in the form of an article of manufacture such as a bottle, jar, tumbler or other container as well as sheet glass and the like, is treated soon after the article leaves the glass-forming machine. As the glass article is being conveyed to the annealing lehr, a compound containing tin or titanium is applied onto the exterior of the glass surface while the glass surface is at a temperature above the temperature at which the compound pyrolyzes. The range of temperatures necessary to pyrolyze the titanium or tin containing compounds varies between about 700° F. and 1300° F., depending upon the particular compound used, with the usual range being from about 800° F. to about 1200° F.

The titanium or tin containing compound which is employed for purposes of the present invention is one which upon contact with the heated glass surface will react to form a substantially colorless, transparent layer or coating of an oxide of the metal, primarily $TiO_2$ or $SnO_2$, on the glass surface. The oxide layer is tightly adherent to the surface of the glass and is believed to have an average thickness of up to about one micron, and preferably less than one micron.

Among the titanium-containing compounds suitable for purposes of the present invention are the alkyl titanates, preferably wherein the alkyl group contains from 1 to about 8 carbon atoms, and including tetrabutyl titanate, tetraisopropyl titanate, tetrakis(2-ethylhexyl) titanate and the like. Also included among the suitable titanium-containing compounds are the titanium tetrahalides, and particularly titanium tetrachloride.

The tin compounds that may be used for the purpose of the present invention include both stannous and stannic compounds. Among the suitable stannic compounds are the stannic halides, and the alkyl stannic carboxylates. The stannic halide can be exemplified by stannic chloride, stannic bromide, and stannic iodide. The alkyl stannnic carboxylates have the general formula $$(R_1)_xSn(OOCR_2)_y$$

wherein $R_1$ and $R_2$ are alkyls, and wherein $x$ and $y$ are whole numbers from 1 to 3, the sum of which is equal to four. The alkyls may be branched or straight chain. $R_2$ preferably contains from 1 to 18 carbon atoms and can be a stearate, palmitate, laurate, or the like. $R_1$ preferably contains 1 to 8 carbon atoms and may be methyl, propyl, butyl, isopropyl, isobutyl, hexyl, octyl or the like. Included among the many compounds coming within the scope of the foregoing are dibutyl tin diacetate, dipropyl tin diacetate, dioctyl tin diacetate, dibutyl tin distearate, dibutyl tin dipalmitate, dibutyl tin dilaurate, dibutyl tin maleate and the like.

Among the stannous tin compounds suitable for the purposes of this invention are stannous dihalides, such as stannous chloride, stannous bromide, stannous iodide and the carboxylic acid salts of stannous tin. The latter include compounds having the formula $$Sn(-O-\overset{O}{\overset{\|}{C}}-R)_2$$

wherein R is an aliphatic or aromatic group. Included among the aliphatic groups are the alkyls, both substituted and unsubstituted having up to 18 carbon atoms. The aromatic groups include the cyclic carboxylic acids wherein the aryl is benzyl, phenyl, naphthyl, or the like. Among the carboxylic acid salts suitable for the purpose of this invention are stannous oleate, stannous palmitate, stannous stearate, stannous caproate, stannous laurate, stannous naphthenate, stannous tartrate, stannous gluconate, stannous acetate, and the like. It is to be understood that any titanium or tin compound may be used in forming initial coating on the glass, provided that such a compound is capable of pyrolyzing to the oxide on the glass surface.

The glass articles coated with a thin transparent titanium or tin oxide layer as described above, thereafter enter the annealing lehr and are progressively cooled over a period of time to about 450° F. or lower and are then treated with the organic coating composition.

The organic coating composition can be applied by any suitable means such as a traversing spray nozzle at varying spray rates, such as about 0.5 to about 5 quarts of the mixture per 100 square feet of the lehr belt. Usually the spraying is done at the rate of about 1 quart/ 100 sq. ft. near the cold end of the lehr when the temperature is in the range of about 100° F. to about 400° F.

The organic coating composition has been described as an aqueous solution of the reaction product of a hydroxylated organic compound and poly(methyl vinyl ether/maleic anhydride). Specific compounds within this class are the partial esters of an alcohol and the interpolymer of methyl vinyl ether and maleic anhydride.

The interpolymer of methyl vinyl ether and maleic anhydride can be represented structurally by the formula:

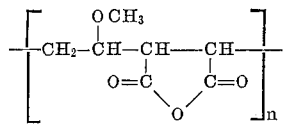

where $n$ is an integer from about 3000 to about 6000. This interpolymer is known in the art, and methods of preparation are described in the literature [see Schildnecht, C. E., "Vinyl and Related Polymers," John Wiley & Sons, Inc. pp. 628–630 (1952); see also U.S. Reissue Pat. No. 23,514]. This interpolymer is also commercially available from the General Aniline & Film Corporation under the trademark of GANTREZ AN.

Partial ester of this interpolymer are obtained by reacting the interpolymer with alcohol.

The alcohol employed can be primary, secondary or tertiary alcohol. This includes straight or branched chain aliphatic alkanols such as methanol, ethanol, n-propanol, isopropanol, n-butanol, secondary butanol, aryl alcohol, isoamyl alcohol, butanol, 1-decanol, dodecanol, tetradecanol, hexadecanol, octadecanol, eicosanol, tricosanol, nonacosanol and the like. Usually the aliphatic alkanols contain from aobut 5 to about 20 carbon atoms. Also included are aromatic alcohols such as phenol, phenyl methanol, phenylethanol, phenylbutanol, phenyldecanol, phenylpentadecanol, phenyloctadecanol, and the like. Polyfunctional alcohols such as polyvinyl alcohol are also suitable for the purposes of the present invention.

Another class of alcohols that are suitable for the purposes of the present invention are the polyalkylene ether alcohols, particularly the polyoxyethylene ether alcohols. These alcohols are alkylene oxide adducts of aliphatic and aromatic alcohols. Specifically, the alkyl phenoxy polyoxyethylene ethanols, the reaction product of ethylene oxide and an alkyl phenol, are particularly suitable in practicing the present invention. These compounds are manufactured and sold by the General Aniline and Film Corporation, under the trademark IGEPAL. These alkyl phenoxy polyoxyethylene ethanols are included in a series of nonionic surfactants having the structural formula

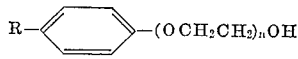

wherein R can be an alkyl having from 8 to 18 carbon atoms, usually octyl, nonyl, and $n$ denotes the moles of ethylene oxide which have been reacted therewith. The mole ratio of ethylene oxide to alkyl phenol can be varied over a wide range such as from 1:1 to 100:1 or even greater. In carrying out the present invention, it is not necessary to limit R in the formula to a particular alkyl or groups of alkyls. Instead R can also be an aromatic, alicyclic, heterocyclic and the like radical and the ethanol can probably be best defined as a parasubstituted phenoxy polyoxyethylene ethanol.

Another class of organic hydroxylated compounds that are suitable for the present purposes are the polyoxyalkylated fatty acids particularly the polyoxyethylated fatty acids. These compounds are of the formula

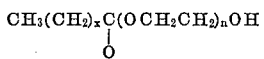

wherein $x$ is an integer from about 1 to about 20 and $n$ is an integer from about 1 to about 100. Compounds within this class are polyoxyethylene stearate, polyoxyethylene palmitate, polyoxyethylene laurate, polyoxyethylene caprylate, polyoxyethylene propanate and the like.

A preferred polyethyoxylated fatty acid is polyoxyethylene monostearate sold under the trademark of MYRJ 52–S and having the formula

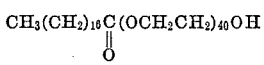

Having described the reaction components employed, in forming the treating solution, the method of preparing the treating solution will be described in terms of structural formula for the reaction between the hydroxylated organic compound (ROH) and the interpolymer of methyl vinyl ether and maleic anhydride.

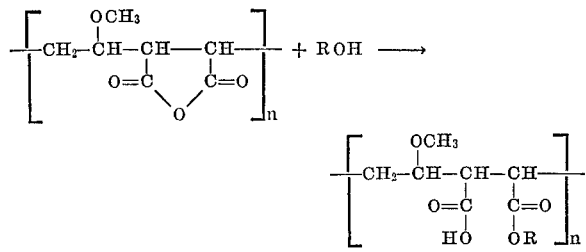

In the above reaction ROH is a general expression for an organic compound containing the reactive hydroxyl group.

In one preferred embodiment, the above reaction can be carried out by reacting the interpolymer and an alcohol in a hot aqueous medium under vigorous agitation. Usually this is accomplished by adding the anhydride slowly to a stirred, heated aqueous solution of the appropriate alcohol. The ratio of interpolymer to alcohol is usually in the range of from about 200 parts of interpolymer to 1 part of alcohol, to about 1 part of interpolymer to about 300 parts of alcohol. This reaction solution is then diluted to about 5% or less, usually about 0.01 to 1%, by weight of solute with water and is ready for use in treating glassware.

The following examples serve to illustrate the present invention but are not to be considered limiting thereof in any way.

EXAMPLE 1

Stannic chloride was applied to the exterior surface of freshly formed glass containers as they were continuously being conveyed from the bottle forming machine to the annealing lehr. Dry air was bubbled through the liquid stannic chloride and this air stream, rich in stannic chloride, was directed to the transfer belt between the annealing lehr and forming machine. A metal enclosure was placed over the transfer belt in order to confine the stannic chloride and air mixture in the vicinity of the freshly formed bottles. The temperature of the surface of the glass was about 800–1000° F. and the stannic chloride was pyrolyzed almost immediately. A clear transparent coating of tin oxide formed upon the surface of the bottles. While the coating was hard, the bottles could, nevertheless be scratched by firmly rubbing two of them against each other.

A number of the containers treated according to the foregoing were then used in the following treatment. Treating solutions were prepared by dissolving the polyoxyethylated octylphenol.

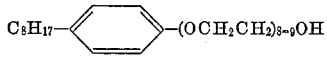

in warm water at about 180°–200° F. under conditions of agitation. Enough of the polyoxyethylated octylphenol was added to make its solution concentration about 0.6% by weight. To this stirred, heated aqueous solution was added the interpolymer of methyl vinyl ether and maleic anhydride, having the structural formula

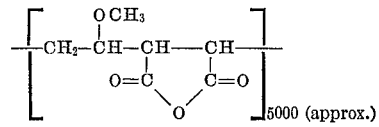

Enough of this interpolymer was added to the reaction solution to make its solution concentration 0.02% by weight.

This reaction solution was sprayed by means of a traversing spray nozzle at the rate of about 1 quart of the solution per 100 square feet of annealing lehr belt at the cold end of the lehr whereby bottle temperature was in the range of 100° F. to 400° F.

At the conclusion of this treatment the bottles were observed to have a clear transparent coating which was hard and resisted scratching when two of the bottles were rubbed together.

The scratch resistance of these bottles were evaluated on a scratch test device under various conditions. The bottles were tested dry, and immersed in water; and dry and immersed in water, after immersion in a 5% solution of NaOH at 150° F. for 30 minutes. This caustic exposure test is designed to simulate conditions existing in certain bottling plants, and is therefore of practical importance.

This scratch test device is designed to abrade the surface of one glass bottle against the surface of a similar glass bottle, and is fully described and illustrated in commonly assigned U.S. Pat. No. 3,323,889. Thus, a bottle is fastened securely in a stationary low set of chucks, while a second bottle is fastened in a set of upper chucks, which are positioned so that the axes of the bottles are at 90° relative to each other. A test load is applied to the upper bottle while it is being driven at a constant speed of 2.8 inches per minute in a direction 45° to the axis of each bottle. The actual rate of scratch propagation on the bottles is then 2 inches per minute.

Using the foregoing test apparatus, a fresh surface of one bottle is always contacted with a fresh surface of the other bottle. Since the base of each bottle extends in the direction of motion, the scratch is propagated from the shoulder portion toward the base. This permits the detection of poor scratch protection in a particular section of the ware, since identical sections of each bottle are contacted. The force exerted by the second bottle is a known, measured force and, after each pass, the bottles are examined for scratches.

The scratch resistance test value is the least force value (usually expressed in pounds) that causes a visible scratch on the surface of the test bottles. The higher test values thus indicate the better abrasion resistant coatings. For the purposes of comparison it has been determined that untreated glassware, and glassware treated with only the tin or titanium oxide have a scratch resistance test value of only about 5 pounds or less. Bottles treated with only the organic coating solutions described herein have a scratch resistance value of about 20 pounds or less.

Another known method of evaluating the lubricious quality of a treated surface is by determining the angle of repose, with a low angle indicating a more lubricious surface. The angle of repose is determined by placing two bottles horizontally side by side on a supporting platform and then placing a third bottle, also in a horizontal position, directly upon the first two bottles so as to form a pyramid. One end of the supporting platform is then lifted slowly at a uniform rate so as to generate an angle with the horizontal. The angle of the platform to the horizontal at the time the third bottle begins to slide relative to the first two bottles, which are prevented from moving with respect to the platform, is referred to as the angle of repose. The more lubricious the surface, the lower will be the angle of repose. Apparatus for measuring the lubricity of glass surfaces are well-known in the art.

The results of the scratch test and the angle of repose test for the bottles treated in his example are reported in Table I. Also reported in Table I are the test results of bottles similarly treated with stannic chloride and overcoated with the aqueous solutions listed in the table.

Solution A

Component 1—methyl vinyl ether and maleic anhydride interpolymer, and
Component 2—nonylphenoxypoly(ethyleneoxy)$_9$ ethanol;

Solution B

Component 1—methyl vinyl ether and maleic anhydride interpolymer, and
Component 2—nonylphenoxypoly(ethyleneoxy)$_{40}$ ethanol;

Solution C

Component 1—methyl vinyl ether and maleic anhydride interpolymer, and
Component 2 — nonylphenoxypoly(ethyleneoxy)$_{100}$ ethanol;

Solution D

Component 1—methyl vinyl ether and maleic anhydried interpolymer, and
Component 2—poly(ethyleneoxy)$_{40}$ monostearate.

TABLE I

| Treating solution, weight percent | | Pounds force required to produce light scratch | | | | Angle of repose | | | |
|---|---|---|---|---|---|---|---|---|---|
| Octylphenoxy-poly(ethyl-eneoxy) ethanol | Methyl vinyl ether [1] | Dry | Wet | Dry [2] | Wet [2] | Dry | Wet | Dry [2] | Wet [2] |
| 0.6 | 0.02 | 100 | 100 | 20 | 25 | 14 | 18 | 26 | 16 |
| 0.6 | 0.04 | 100 | 100 | 55 | 85 | 14 | 18 | 24 | 17 |
| 0.6 | 0.06 | 55 | 100 | 55 | 100+ | 15 | 16 | 25 | 19 |

[1] Maleic anhydride interpolymer.
[2] After immersion in 5% NaOH for 1/2 hour at 150° F.

EXAMPLE 2

Bottles were treated according to the method of Example 1 except that an aqueous solution of 0.25% by weight polyvinyl alcohol and 0.25% by weight of the methyl vinyl ether and maleic anhydride interpolymer were used as the overcoating solution. The results are shown in Table II.

TABLE III

| Treating solution | Weight ratio of component 1 to component 2 | Pound required to produce light scratch | | | | Angle of repose | | | |
|---|---|---|---|---|---|---|---|---|---|
| | | Dry | Wet | Dry [2] | Wet [2] | Dry | Wet | Dry [2] | Wet [2] |
| A | 4:1 | 100+ | 100+ | 100+ | 100+ | 9 | 20 | 11 | 15 |
| | 2:1 | 100+ | 100+ | 100+ | 100+ | 17 | 14 | 29 | 19 |
| | 1:1 | 100+ | 100+ | 100+ | 100+ | 20 | 16 | 20 | 16 |
| | 1:2 | 100+ | 100+ | 100+ | 100+ | 18 | 17 | 12 | 12 |
| | 1:10 | 30 | 100+ | 10 | 100+ | 30 | 28 | 23 | 21 |
| B | 4:1 | 100+ | 100+ | 40 | 100+ | 12 | 17 | 14 | 14 |
| | 2:1 | 100+ | 100+ | 100+ | 100+ | 7 | 17 | 21 | 22 |
| | 1:1 | 100+ | 100+ | 70 | 100+ | 10 | 16 | 21 | 18 |
| | 1:2 | 100+ | 100+ | 100+ | 100+ | 14 | 16 | 19 | 19 |
| | 1:10 | 55 | 100+ | 20 | 100+ | 24 | 24 | 18 | 25 |
| C | 4:1 | 100+ | 100+ | 100+ | 100+ | 7 | 14 | 15 | 15 |
| | 2:1 | 100+ | 100+ | 55 | 100+ | 11 | 15 | 17 | 21 |
| | 1:1 | 100+ | 100+ | 100+ | 100+ | 11 | 14 | 12 | 23 |
| | 1:2 | 85 | 100+ | 40 | 100 | 10 | 12 | 11 | 17 |
| D | 4:1 | 30 | 100+ | 30 | 100+ | 9 | 13 | 18 | 27 |
| | 2:1 | 100 | 100+ | 30 | 100+ | 13 | 28 | 21 | 21 |
| | 1:1 | 10 | 85 | 20 | 100+ | 14 | 39 | 18 | 28 |

NOTE.—See footnote 2 bottom Table I.

TABLE II

| Treating solution, weight percent | | Pounds force required to produce light scratch | | | | Angle of repose | | | |
|---|---|---|---|---|---|---|---|---|---|
| Polyvinyl alcohol | Methyl vinyl ether [1] | Dry | Wet | Dry [2] | Wet [2] | Dry | Wet | Dry [2] | Wet [2] |
| 0.25 | 0.25 | 100 | 100 | 100+ | 100+ | 34 | 21 | 13 | 13 |

NOTE.—See footnotes bottom of Table I.

EXAMPLE 3

This example demonstrates the use of four additional reaction solutions of methyl vinyl ether and maleic anhydride interpolymer, and various hydroxylated organic compounds. These solutions were prepared and applied to tin oxide treated bottles according to the method of Example 1.

Each of the four solutions contain 0.25% by weight solution with the balance (99.75%) being water. The solutions are described below. This description is used in the first two columns of Table III.

The foregoing exemplary data clearly demonstrates the unexpected improvement in scratch resistance of a glass surface when the surface is treated with the dual coating method of the present invention.

What is claimed is:

1. In a method for increasing the scratch and abrasion resistance of a glass surface which comprises applying pyrolyzable tin or titanium compounds onto a hot glass surface to form a substantially colorless tin or titanium oxide layer thereon and subsequently applying an organic material onto said oxide layer in an amount sufficient to form a substantially colorless layer thereon, the improvement wherein said latter step comprises spraying a water solution of a water soluble reaction product of an interpolymer of the formula

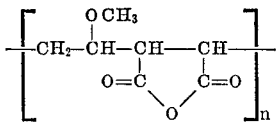

wherein $n$ is an integer from about 3,000 to about 6,000 and a hydroxylated compound which is a member selected from the group consisting of

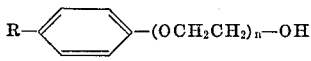

wherein R is an alkyl group having from 8 to 18 carbon atoms and wherein $n$ is an integar from about 1 to about 100, polyvinyl alcohol, and $$CH_3(CH_2)_x-\underset{\underset{O}{\|}}{C}-(OCH_2CH_2)_n-OH$$

wherein $x$ is an integer from 1 to about 20 and wherein $n$ is an integer from about 1 to about 100, said reaction product being water resistant subsequent to its application.

2. The improvement of claim 1 wherein said hydroxylated compound is

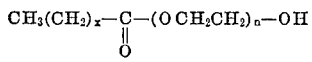

$n$ being 8.

3. The improvement of claim 1 wherein said hydroxylated compound is

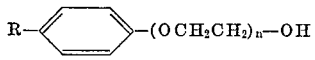

$n$ being 40.

4. The improvement of claim 1 wherein said hydroxylated compound is

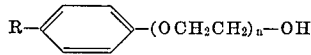

$n$ being 100.

5. The improvement of claim 1 wherein said hydroxylated compound is $$CH_3(CH_2)_x\underset{\underset{O}{\|}}{C}(OCH_2CH_2)_nOH.$$

6. The improvement of claim 5 wherein said compound is polyoxyethylene stearate.

7. A method for increasing the abrasion resistance of a glass surface which comprises treating said surface with a tin-containing compound or a titanium-containing compound, which is pyrolyzable to form the corresponding metal oxide on said surface, while said surface is at a temperature at least as high as the temperature at which said compounds pyrolyze, cooling said treated surface to a temperature below about 450° F. and applying onto said treated glass surface in an aqueous medium the reaction product of a hydroxylated organic compound and an interpolymer of methyl vinyl ether and maleic anhydride in an amount sufficient to form a thin, substantially colorless, transparent coating on said surface, the ratio of said interpolymer to said hydroxylated compound being in the range of about 200:1 to about 1:300, said hydroxylated organic compound being a member selected from the group consisting of polyoxyalkylated fatty acids, polyalkylene ether alcohols, aliphatic alcohols having from about 5 to about 29 carbon atoms, aromatic alcohols having up to 24 carbon atoms and polyvinyl alcohol, said interpolymer being represented by the formula

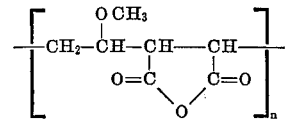

wherein $n$ is an integer from about 3,000 to about 6,000.

8. The method of claim 7 wherein said reaction product is applied by spraying an aqueous solution thereof.

9. The method of claim 8 wherein said hydroxylated organic compound is a parasubstituted phenoxy polyoxyethylene ethanol having the structural formula

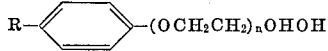

wherein R is an alkyl having from 8 to 18 carbon atoms and $n$ is an integer from about 1 to about 100.

10. The method of claim 9 wherein R is octyl and $n$ is 8.

11. The method of claim 9 wherein R is nonyl and $n$ is 40.

12. The method of claim 9 wherein R is nonyl and $n$ is 100.

13. The method of claim 8 wherein said hydroxylated organic compound is a polyoxyethylated fatty acid having the formula $$CH_3(CH_2)_x\underset{\underset{O}{\|}}{C}(OCH_2CH_2)_nOH$$

wherein $x$ is an integer from about 1 to about 20; and $n$ is an integer from about 1 to about 100.

14. The method of claim 13 wherein $x$ is 16 and $n$ is 40.

15. The method of claim 8 wherein said hydroxylated organic compound is polyvinyl alcohol.

16. A method for applying a label accepting scratch and abrasion resistant coating to a glass surface comprising:

forming a thin, substantially transparent, metal oxide layer directly on said glass surface by treating said surface with tin-containing or titanium-containing compounds, which are pyrolyzable to form their respective metal oxides on said glass surface while said surface is at a temperature at least as high as the temperature at which said compounds pyrolyze; and applying onto said metal oxide layer, while said oxide layer is at a temperature below about 450° F., an aqueous solution of the reaction product of (I) an interpolymer of methyl vinyl ether and maleic anhydride represented by the formula

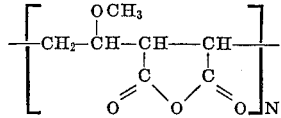

wherein N is an integer from about 3,000 to about 6,000 and (II) a hydroxylated compound selected from the group consisting of polyvinyl alcohol, alkyl phenoxy polyoxyethylene ethanol having the formula

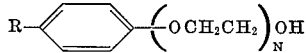

wherein R is an alkyl group having from 8–18 carbon atoms and N is a number between about 11 and about 100, and polyoxyethylated fatty acids of the formula $$CH_3(CH_2)_x\underset{\underset{O}{\|}}{C}(OCH_2CH_2)_nOH$$

wherein $x$ is an integer from about 1 to about 20, and $n$ is an integer between about 1 and about 100, the weight ratio of said interpolymer to said hydroxylated compound being in the range of 200:1 to about 1:300, said solution being applied in an amount to form a thin, substantially transparent coating.

17. The method of claim 16 wherein said tin-containing compound is stannic chloride, said titanium-containing compound is titanium tetrachloride, and wherein said hydroxylated compound is nonyl phenoxy polyethylene ethanol or octyl phenoxy polyoxyethylene ethanol.

18. The method of claim 17 wherein said solution has a solute concentration of less than about 5 percent by weight.

19. The method of claim 18 wherein the weight ratio of said interpolymer to said hydroxylated compound is from 0.02 part interpolymer per 0.6 part hydroxylated compound to about 4 parts interpolymer per 1 part hydroxylated compound and wherein the solution concentration is from about 0.01 to about 1 percent by weight solute.

20. The method of claim 16 wherein said tin-containing compound is stannic chloride, said titanium-containing compound is titanium tetrachloride, and wherein said hydroxylated compound is polyoxyethylene stearate.

21. The method of claim 20 wherein the solution has a solute concentration of less than about 5 percent by weight.

22. A method for increasing the abrasion resistance of a glass surface which comprises treating said surface with tin tetrachloride or titanium tetrachloride while said surface is at a temperature at least as high as the temperature at which the tetrachlorides pyrolyze to form the corresponding substantially colorless metal oxide on said surface, cooling said treated surface to a temperature in the range of about 100° F. to about 400° F., and spraying onto said treated surface an aqueous solution of the reaction product of an interpolymer of the formula

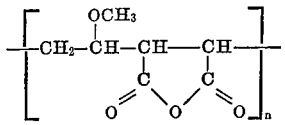

wherein $n$ is from about 3,000 to about 6,000 and an organic compound selected from the group consisting of polyoxyethylene stearate and alkyl phenoxy polyoxyethylene ethanol wherein the alkyl group has 8 or 9 carbon atoms, said solution being applied in an amount sufficient to form a thin, substantially colorless coating which is water and caustic resistant and which has an affinity for paper labels, the weight ratio of said interpolymer to said organic compound being in the range of about 200:1 to about 1:300.

23. As an article of manufacture, a glass surface having scratch and abrasion-resistant dual coating thereon, said coating being water and caustic resistant and having an affinity for paper labels, said coating comprising a thin, substantially colorless metal oxide layer bonded directly to said glass surface, said metal oxide being tin oxide or titanium oxide, and a thin, substantially colorless organic layer bonded directly to said metal oxide layer, said organic layer being the reaction product of an interpolymer of methyl vinyl ether an maleic anhydride structurally represented by the formula

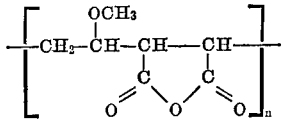

wherein $n$ is an integer between 3,000 and about 6,000, and a hydroxylated compound selected from the group consisting of polyoxyalkylated fatty acids, polyalkylene ether alcohols, polyvinyl alcohol, aliphatic alcohols having from about 5 to about 29 carbon atoms, and aromatic alcohols having up to 24 carbon atoms, wherein the ratio of said interpolymer to said hydroxylated compound is in the range of 200:1 to about 1:300.

24. The article of claim 23 wherein said hydroxylated compound is a compound of the formula

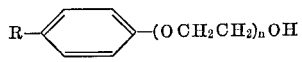

wherein R is an alkyl having 8–18 carbon atoms and $n$ is an integer from about 1 to about 100.

25. The article of claim 24 wherein R is octyl and $n$ is 100.

26. The article of claim 24 wherein R is nonyl and $n$ is 40.

27. The article of claim 24 wherein R is nonyl and $n$ is 100.

28. The article of claim 23 wherein said hydroxylated compound is a compound of the formula

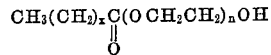

wherein $x$ is an integer from about 1 to about 20, and $n$ is an integer from about 1 to about 100.

29. The article of claim 28 wherein $x$ is 16.

30. The article of claim 29 wherein $n$ is 40.

References Cited

UNITED STATES PATENTS

| | | | |
|---|---|---|---|
| 2,977,334 | 3/1961 | Zopf et al. | 260—78.5UX |
| 3,161,534 | 12/1964 | Dettre | 117—124X |
| 3,161,535 | 12/1964 | Dettre | 117—124X |
| 3,323,889 | 6/1967 | Carl et al. | 117—124X |
| 3,414,429 | 12/1968 | Bruss et al. | 117—124X |
| 3,418,154 | 12/1968 | Rawski | 117—124X |
| 3,420,693 | 1/1969 | Scholes et al. | 117—124X |

ALFRED L. LEAVITT, Primary Examiner

W. F. CYRON, Assistant Examiner

U.S. Cl. X.R.

117—124

UNITED STATES PATENT OFFICE
CERTIFICATE OF CORRECTION

Patent No. 3,598,632          Dated August 10, 1971

Inventor(s)      ALTON W. LONG

It is certified that error appears in the above-identified patent and that said Letters Patent are hereby corrected as shown below:

Column 5, line 10, the formula should read - -

- - .

Column 7, line 11, "his" should be - - this - - .
Column 7, line 73, "solution" should be - - solute - - .
Column 8, line 14, under "Solution C", lines 15 and 16 should read - - Component 1 - methyl vinyl ether and maleic anhydride interpolymer, and - - . Column 8, line 33, "dried" should be - - dride - - . Column 9, line 16, claim 1, "integar" should be - - integer - - . Column 10, line 7, the formula in claim 9 should read - -

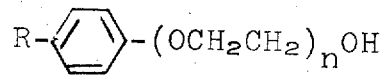

- - .

Column 10, line 56, claim 16, "11" should be - - 1 - - .

Column 11, line 49, claim 23, "an" should be - - and - - .

Signed and sealed this 14th day of March 1972.

(SEAL)
Attest:

EDWARD M. FLETCHER, JR.
Attesting Officer

ROBERT GOTTSCHALK
Commissioner of Patents